(No Model.)
P. VONHOF.
HOISTING MACHINE.
No. 391,440. Patented Oct. 23, 1888.
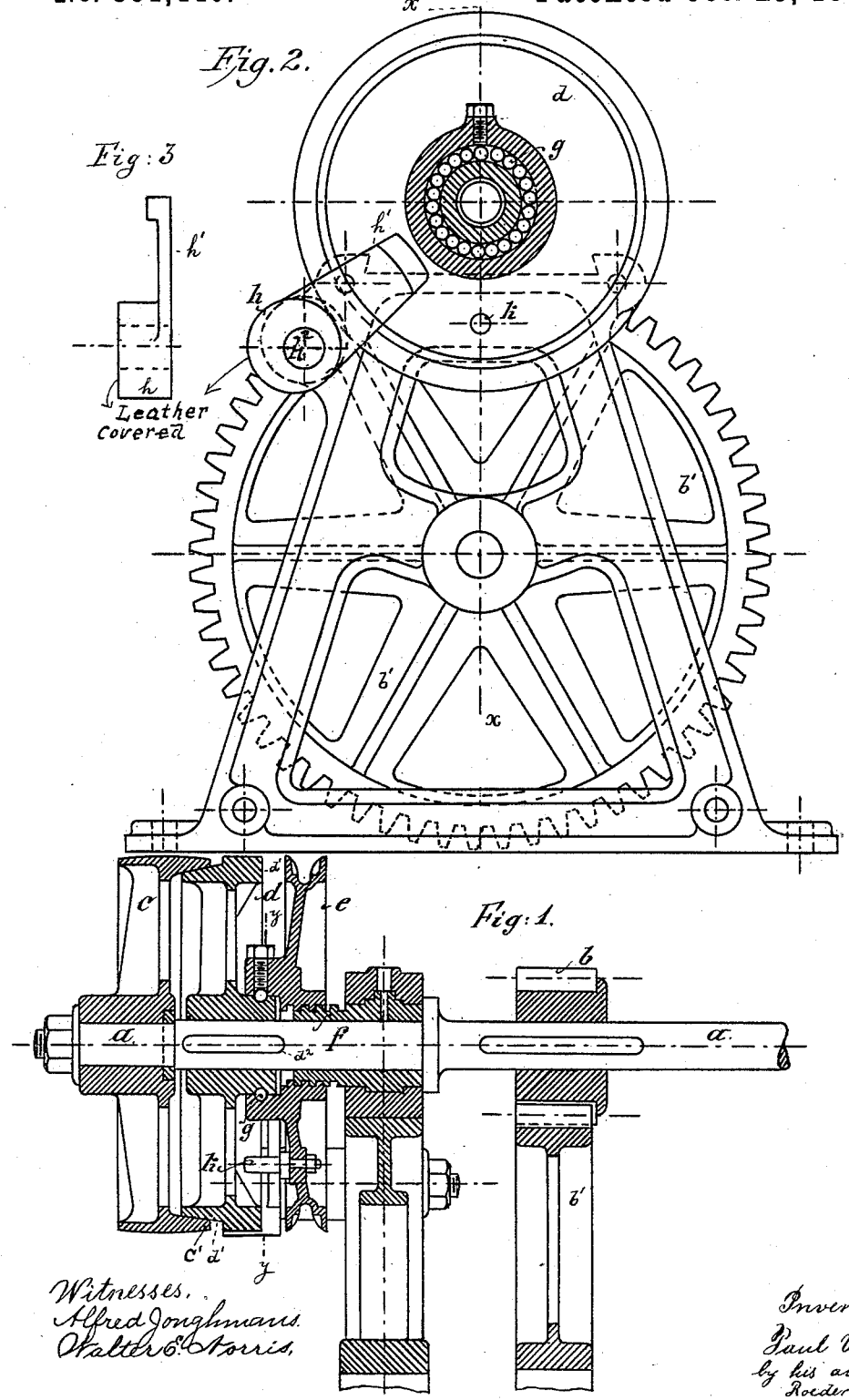

UNITED STATES PATENT OFFICE.

PAUL VONHOF, OF SACHSENBURG, NEAR HELDRUNGEN, PRUSSIA, GERMANY.

HOISTING-MACHINE.

SPECIFICATION forming part of Letters Patent No. 391,440, dated October 23, 1888.

Application filed June 20, 1888. Serial No. 277,677. (No model.)

*To all whom it may concern:*

Be it known that I, PAUL VONHOF, a subject of the King of Prussia, residing at Sachsenburg, near Heldrungen, in the Kingdom of Prussia, German Empire, have invented new and useful Improvements in Hoisting-Machines, of which the following is a specification.

This invention relates to an improved coupling for transmitting motion from the loose pulley to the driving-shaft, the invention being particularly applicable to hoisting machinery.

The invention consists in the various features of improvement, more fully pointed out in the claims.

In the accompanying drawings, Figure 1 is a vertical section of upper part of Fig. 2 on line $x\,x$, Fig. 2. Fig. 2 is a vertical transverse section on line $y\,y$, Fig. 1. Fig. 3 is a detail end view of the eccentric $h$.

The letter $c$ represents a permanently-rotating loose pulley, which has a tapering inner rim, $c'$, that engages by friction the tapering outer rim, $d'$, of a fast pulley, $d$. The pulley $d$ is connected by means of a feather, $d^2$, with the driving-shaft $a$ in such a manner that it can slide longitudinally upon said shaft, and can thus couple or uncouple with loose pulley $c$. To move the pulley $d$, I employ a wheel, $e$, which I term a "chain-wheel," as its periphery is adapted to be surrounded by an endless chain. The chain-wheel $e$ has a threaded hub engaged by a fixed threaded collar, $f$, on shaft $a$, and by revolving the chain-wheel it can be moved backward or forward on shaft $a$. The hub of wheel $d$ is overlapped by the hub of wheel $e$, and each hub has a groove which is semicircular in cross-section. The two hubs, when superposed, form one single groove between them which is circular in cross section. Into this groove there are placed a number of steel balls, $g$, which serve to reduce the friction between the wheels $d\,e$. The balls $g$ form a rotating intermediate connection between the revolving wheel $d$ and the stationary chain-wheel $e$, and transform the direction of the rotation, and consequently also of the friction, into an inverse one, so that the friction between the loose pulley $c$ and the wheel $d$ will not be loosened by the friction produced between the balls $g$ and the pulley $d$, even in using steep cones and a very slight pressure.

An automatic stop for the mechanism is obtained by the arrangement on one side of the frame and in front of the brake-wheel $d$ of an eccentric, $h$, provided with a lever-arm, $h'$, and revolving on a pivot, $h^2$. To increase the friction, the eccentric is provided with a leather covering. The eccentric, being weighted only on one side by the lever-arm $h'$, is always in contact with the wheel $d$, and allows the latter to be turned to the right—that is to say, in the direction in which the raising of the load is effected—but not in the contrary direction, as it acts proportionally to the pressure as an eccentric brake. If the load is to be lowered, the chain-wheel carrying a pivot, $k$, is turned until the latter has arrived underneath the lever-arm $h'$ of the eccentric $h$. By the revolution of the chain-wheel $e$ in an opposite direction the speed of the load is first diminished, and by continuing to revolve the wheel $e$ the wheels $c$ and $d$ will be coupled together by friction and the load will be raised. This mechanism may be put in action from any point of the shaft by means of an endless chain placed around the wheel $e$, or by means of rods.

The shaft $a$ is provided with a pinion, $b$, communicating motion to the wheel $b'$, through which motion is imparted to the shaft of the hoisting-drum.

What I claim is—

1. The combination of shaft $a$, carrying threaded collar $f$, with loose pulley $c$, and pulley $d$, adapted to engage pulley $c$, and with chain-wheel $e$ on collar $f$, the hubs of wheels $d\;e$ being grooved, and with balls $g$ in said groove, substantially as specified.

2. The combination of shaft $a$ with loose pulley $c$, fast pulley $d$, chain-wheel $e$, and balls $g$, and with the eccentric $h$, having arm $h'$, that is adapted to engage pulley $d$, and with pin $k$ on wheel $e$, that is adapted to engage lever-arm $h'$, substantially as specified.

In testimony whereof I have signed my name to this specification in the presence of two subscribing witnesses.

PAUL VONHOF.

Witnesses:
 FRIEDRICH TÜRCKE,
 OSCAR HELLER.